(No Model.)
E. WESTON.
INDICATOR FOR SECONDARY BATTERIES.
No. 282,428. Patented July 31, 1883.
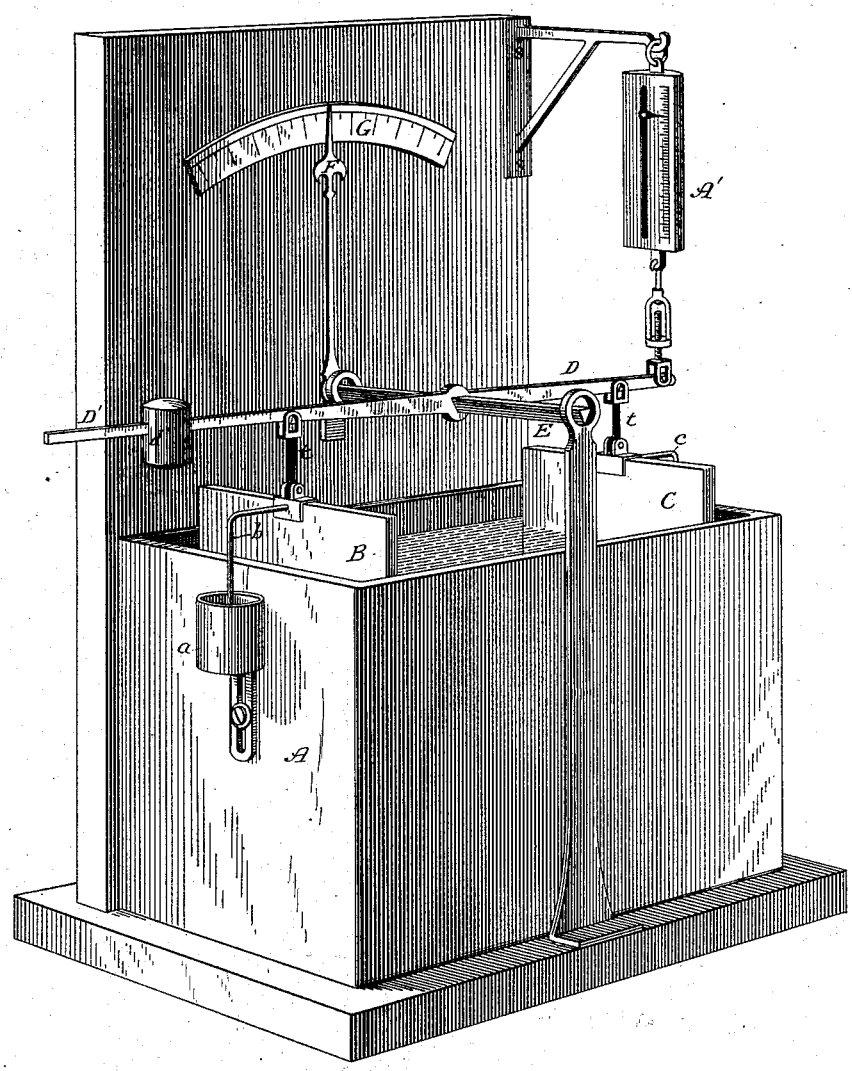

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

INDICATOR FOR SECONDARY BATTERIES.

SPECIFICATION forming part of Letters Patent No. 282,428, dated July 31, 1883.

Application filed March 7, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Indicators for Secondary Batteries, of which the following is a specification, reference being had to the drawing accompanying and forming a part of the same.

In systems involving the use of secondary batteries it is desirable to have some means of indicating the amount of charge which a battery contains at any given time, in order that it may not be connected with the charging-circuit longer than is absolutely necessary, from the fact that the passage of the current through a battery beyond the time when the plates cease to absorb the gases of decomposition results in an injury to the plates.

The object of my invention is to accomplish this in a simple and effective manner, the principle of construction and operation of the devices which I have constructed for this purpose being described in the following specification.

During the intervals of charging and discharging of a secondary battery a certain variation in the relative weights and specific gravities of the plates or electrodes takes place, which is practically proportionate to the amount of charge which the battery has received; or, in other words, the degree of oxidation which the positive electrode has undergone. In illustration, if two electrodes of a secondary battery be suspended from the opposite ends of a balanced beam the positive or oxygen electrode will be found to rise as the charging process goes on and the negative electrode to sink. This takes place, notwithstanding that the oxygen electrode gains in actual weight, for it loses at the same time in specific gravity. The converse of this takes place when the cell is discharging, the preponderance of the hydrogen electrode depending on the degree of oxidation of the positive electrode.

In carrying out my invention I take advantage of these changes and combine with the electrodes of a cell, when arranged to move in accordance with variations in weight and specific gravity, mechanism constructed to operate or be actuated in consequence of such movement, and thereby indicate the changes in the relative weights or specific gravities, and consequently the condition of the battery with respect to the charge which it contains at any given time.

Referring to the drawing hereto annexed, which illustrates in perspective a simple and convenient embodiment of the invention, the letter A designates a box or cell containing an acidulated solution.

B C are plates or electrodes, such as are commonly employed in a secondary battery. These plates are suspended from a beam, D, which is extended on one side in an arm, D', upon which is fixed an adjustable counterpoise, d'. The plates B C are connected to the beam D by insulated strips t. In order that the plates may have a free movement while connected with the circuit, bent wires b c are attached to the plates and dipped into mercury-cups a, (one only of which is shown,) which serve as the terminals of the cell. The beam D is supported by a bar, E, resting in bearings of any proper kind, and carrying a pointer, F, which sweeps over a scale, G, graduated to indicate units corresponding to the relative weights and positions of the plates. A spring-balance, A', is connected to the end of the beam D, from which hangs the hydrogen-plate C. If a current be passed through the cell from the plate C to the plate B, the latter sinks in the liquid, the accumulation of oxide upon the plate B tending to lower its specific gravity, so that the plate C preponderates. The degree of immersion of the plate C in the liquid is proportionate to its preponderance over the plate B, on account of the distension of the spring A', and it is evident, therefore, that this may be utilized as an indication of the amount of charge which the battery has received or expended.

In practice the cell A may be used in conjunction with other cells constituting a battery by connecting it in series with such cells, as it is well known that the condition of all the cells charged or discharged in series is the same.

The mechanism for indicating the amount of charge which I have now described may be greatly varied, as any devices which are actuated by the movement of the plates may be used for the same purpose.

Inasmuch as the absolute as well as relative weights or specific gravities of the electrodes vary during the times of charging and discharging of the batteries, I regard as within the scope of my invention any indicating mechanism that is actuated or brought into operation by a movement due to such variations.

I reserve the right to make subject of other applications features of novelty herein shown or described, but not claimed.

What I claim is—

1. The combination, with a secondary battery-cell, of electrodes capable of movement therein, due to changes in weight or specific gravity, and indicating mechanism constructed to operate in consequence of such movement, substantially as set forth.

2. The combination, with the electrodes of a secondary battery, suspended or balanced as set forth, of indicating mechanism constructed or arranged to be moved or operated by the movement of said electrodes, as described.

3. The combination, with a secondary battery-cell, of a balanced beam or lever, plates or electrodes suspended therefrom, and an indicating-arm constructed to be operated or moved by changes in the position of said beam imparted to it by changes in the weight or specific gravity of the electrodes, as set forth.

4. The combination, with the plates of a secondary battery, suspended so as to be capable of movements due to changes in their relative weights or specific gravities, of mercury contact cups and connections from the plates to the cups, as and for the purpose set forth.

In testimony whereof I have hereunto set my hand this 1st day of March, 1883.

EDWARD WESTON.

Witnesses:
HENRY A. BECKMEYER,
L. V. E. INNES.